United States Patent [19]

Northrup et al.

[11] 4,150,895
[45] Apr. 24, 1979

[54] PHOTOGRAPHIC EASEL SYSTEM

[75] Inventors: Daniel Northrup, Scottsville; Steven Hess, Rochester, both of N.Y.

[73] Assignee: Saunders Photo/Graphic Inc., Rochester, N.Y.

[21] Appl. No.: 815,372

[22] Filed: Jul. 13, 1977

[51] Int. Cl.² .............................................. G03B 27/58
[52] U.S. Cl. ........................................................ 355/74
[58] Field of Search ............ 355/72, 74, 122, 125–131; 354/80, 292

[56] References Cited

U.S. PATENT DOCUMENTS

| 2,199,304 | 4/1940 | Dewey | 355/74 |
| 2,633,058 | 3/1953 | Brouwer | 355/74 X |
| 3,273,452 | 9/1966 | Saunders | 355/74 |

*Primary Examiner*—John Gonzales
*Attorney, Agent, or Firm*—Toren, McGeady and Stanger

[57] ABSTRACT

In the disclosed easel system, a base supports a number of interchangeable facilities for engaging photographic material such as enlarging paper. These facilities may provide variable borders, fixed borders, hold the material for unbordered pictures, and secure the material for contact prints. Hinges hold the various facilities in a preparatory position when the material is being changed.

30 Claims, 19 Drawing Figures

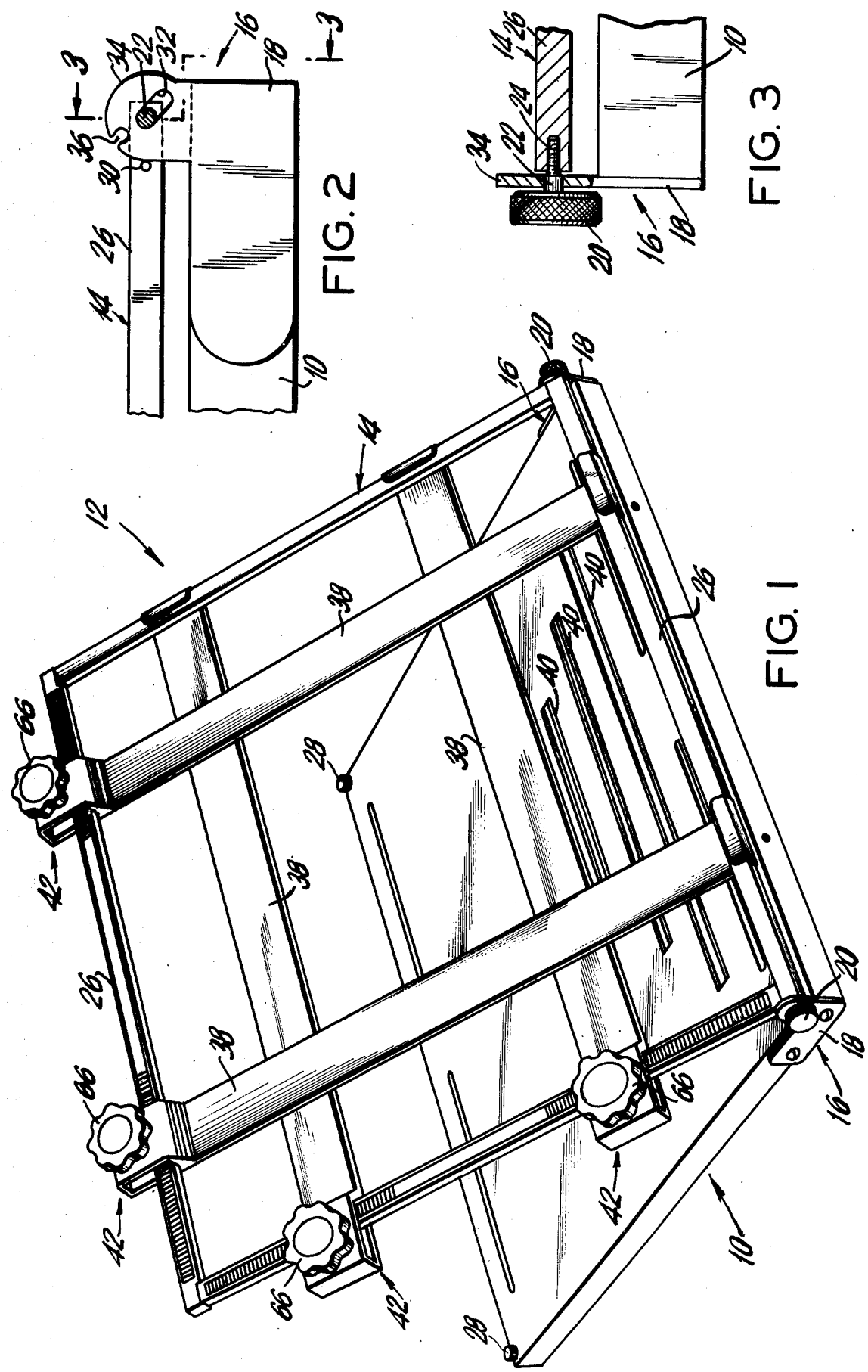

PHOTOGRAPHIC EASEL SYSTEM

BACKGROUND OF THE INVENTION

This invention relates to photographic easels and particularly to easels capable of exposing photographic papers and the like for the production of photographic prints and enlargements of various types.

Photographic easels are normally used for exposing photographic papers and the like to various images. If a photographic easel is to be used for custom enlargements, in which the sizes of the resulting prints vary, and in which each print is to be surrounded by a border, it is customary to use an easel with movable thin opaque blades that form the borders at the edges of the prints. For such custom work, accuracy and adaptability are more important than the speed with which papers may be placed and removed from the easel. On the other hand, for rapid mass production of prints having uniform sizes and borders, speed and ease of loading and removal of the paper from the easel becomes essential. Different types of easels are usually used for these various purposes.

Recently, it has become customary to utilize all of the photographic material on a photographic paper by exposing the paper to produce borderless prints. A larger image results from the same size paper. While it would appear that no easel would be necessary for such borderless prints, photographic papers tend to curl and thus some means are necessary to hold the paper without interfering with the light emerging from an enlarger which focuses an image upon the paper. Usually, transparent plates are unsuitable for this purpose because of the losses incurred by inter-surface reflections. On the other hand, such transparent plates are quite suitable for exposing photographic papers in the production of contact prints.

Because of the various demands, different types of easels are used for these purposes. Examples of such easels appear in U.S. Pat. Nos. 2,848,923 and 3,273,452. However, each of these easels only performs one of the aforementioned desired functions.

Moreover, most easels are composed of a base and a facility for engaging the paper. Normally, the engagement device must be raised to insert and remove the paper. Often, it is necessary to hold the engagement means in a raised position. This usually requires setting a comparatively complex holder such as that shown in U.S. Pat. No. 2,848,923.

An object of the invention is to avoid the aforementioned difficulties.

Another object of the invention is to improve photographic easels.

SUMMARY OF THE INVENTION

The invention provides an easel system capable of use for custom work with variable bordered print sizes, for production operation with bordered prints of uniform size, for holding borderless prints, and for exposing contact proofs.

The invention also furnishes means for holding the engagement assembly, such as a bladed masking frame in a raised position with a simple hinge arrangement.

According to a feature of the invention, a photographic easel system for engaging photographically sensitive material includes a base and engagement means removably secured to the base for engaging the photographically sensitive material. The base has a flat portion for supporting the material, a plurality of elongated edges, hinging means including a pair of hinged brackets secured to a pair of the edges, and holding means including a vertical portion along one of the edges, with the vertical portion having a pair of threaded openings and the flat portion having a plurality of slots parallel to one of the edges. The engagement means are securable to one of the hinging means and the holding means.

According to another feature of the invention, hinge brackets are secured to the pair of edges and extend transverse to the flat portion and terminate in respective upper portions with the upper portions forming coaxial arcs about a common axis. Each bracket forms first and second spaced slots radial relative to the arcs. The first slot on each bracket extends radially inward from the upper portion at an acute angle relative to the flat portion of the base. The second slot embraces the axis and extends from the axis away from the first slot in alignment with the first slot.

According to another feature of the invention, the engagement means includes a plate having a fastened portion and a second portion and removable fastening means for fastening the fastened portion of the plate to the vertical portion of the base, the second portion being aligned by the first portion to form an elongated barrier for the material at the one edge. The engagement means includes a pair of elongated bars removably mounted on the flat portion at the slots on a face of the flat portion which is to support the material. The engagement means when mounted extend transverse to the direction of the plate and form second and third barriers for the material.

According to another feature of the invention, the engagement means further include a frame of fixed dimensions, a spine along one edge of the frame, articulating means for hinging the frame to the spine, and securing means for securing the spine to the plate.

According to another feature of the invention, the engagement means include an adjustable blade masking assembly having a frame, a plurality of movable masking blade arrangements movably mounted on the frame, and a pair of first pins projecting from the frame for riding on the upper portions of the brackets and in the first radial slots of the brackets. A pair of second pins project through the second slots in the brackets and are secured to the frame.

According to another feature of the invention, the first pins have outer circumferences and the second pins have respective pin axes. The minimum spacing between the outer circumferences of the first pins and the axis of the second pins are substantially equal to the radii of the coaxial arcs.

According to another feature of the invention, the brackets and pins are constructed to maintain the second pins so that the pin axes are coaxial with the common axis when the frame is in a substantially flat position parallel to the flat portion.

According to another feature of the invention, each of the brackets includes a vertical portion substantially tangential with the coaxial arcs and transverse to the flat portion and angular relative to the second slots so that the movement of the first pins to the juncture of the coaxial arcs and the vertical portion maintains the second pins coaxial with the common axis.

According to yet another feature of the invention, the first pins slide into the first slots when the frame is moved into an angular position relative to the flat portion and released, and the second pins slide along the second slot with the pins holding the frame in the angular position in response to a gravitational pull.

According to another feature of the invention, a transparent plate having a spine with pins similar to those in the frame of the masking assembly engages the bracket in place of the masking assembly. The transparent plate can then hold down photographic material for contact prints.

According to another feature of the invention, the blade masking assembly includes a plurality of masking blades each extending across the frame and mounting means surrounding a frame member with the blade. The mounting means includes a C-shaped structure surrounding the frame member and a spool having inwardly tapered flanges engaging the member within the extrusion. Spring means bias the inwardly tapered flanges against the member.

These and other features of the invention are pointed out in the claims. Other objects and advantages of the invention will become evident from the following detailed description when read in light of the accompanying drawings.

BRIEF DESCRIPTION OF THE DRAWINGS

In the drawings:

FIG. 1 is a perspective view of an easel system embodying features of the invention and using one of the engagement means.

FIG. 2 is a detailed elevation of a hinging arrangement in FIG. 1.

FIG. 3 is a section 3—3 of FIG. 2.

DESCRIPTION OF PREFERRED EMBODIMENTS

Figure 4:
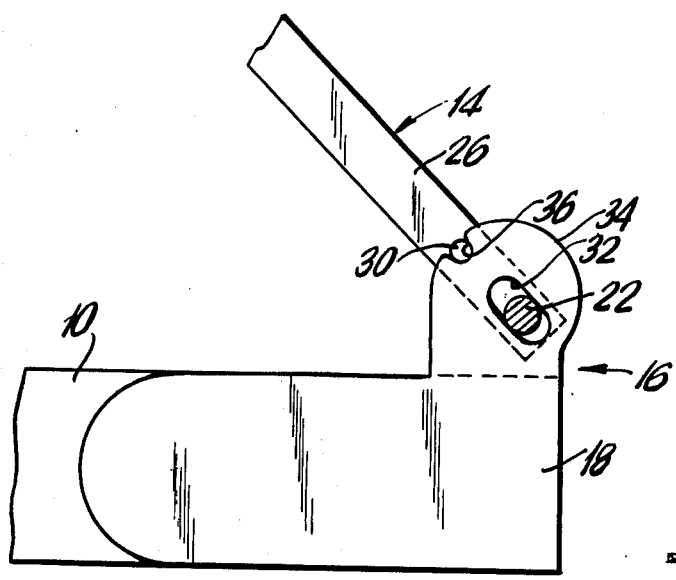
FIG. 4 is an elevation similar to FIG. 2 showing the engagement means in the raised gravity locked position.

In FIG. 1, a flat steel base unit 10 forms an easel 12 with an interchangeable adjustable blade masking assembly 14. The base unit 10 is the foundation for an easel system in which the base unit is constructed to accept a number of attachments including the adjustable blade masking assembly, borderless paper retainers, a proofing accessory, and single size easel frames.

The assembly 14 is detachably mounted on the base unit 10 by means of hinges 16 composed of L-shaped brackets 18 screwed to the sides of the base unit 10 at the back thereof. Details of the hinge 16 are shown more clearly in FIGS. 2 through 5. Knurled thumbscrews 20 having axially projecting peripherally-smooth hinge sections 22 terminate in threaded bolts 24 that are detachably secured to threaded holes in the back member of a frame 26 on the masking assembly 14.

When the assembly 14 is placed horizontally as shown in FIG. 2, its front end rests upon two rubber spacers mounted on the base unit 10. At each hinge 16, a pin 30 projecting outwardly from the frame 26 rests on the periphery of the bracket 18 while the hinge section 22 of the thumbscrew 20 passes through the top section of an angular slot 32 in the bracket. The angular slot 32 terminates in rounded ends, the top of which receives the hinge section 22. When the thumbscrew 20 is secured into the frame 26 the spacing between the hinge section 22 and the pin 30 is such as to cause the frame 26 to rest at the position shown in FIG. 3. The spacing between the pin 30 and the hinge section 22 in such that the center of the hinge section is coaxial with the circular periphery 34 at the end of the bracket 18. Preferably, the position of the hinge section 22 is such that it rests against the upper rounded end of the slot 32. Also preferably the distance from the center of hinge section 22 to the outside of pin 30 is substantially equal to the radius of the arc of the periphery 34.

An operator may lift and temporarily lock the frame assembly 14 into the position shown in FIG. 1 by raising the frame 26 until the pin 30 on each side of the frame 26 aligns with a locking groove 36 on each bracket 18. The operator then releases the frame 26 and allows it to slide to the position shown in FIG. 4. The frame 26 then slips back by gravity action to hold the easel in the open position for loading. To release the unit the operator merely pulls up on the frame 26 which moves the hinge sections 22 along the angular slot 32 to release the pins 30 from the locking grooves 36 and then lowers the frame to the position shown in FIG. 2. During this lowering, the pins 30 ride along the circular periphery 34.

Figure 5:
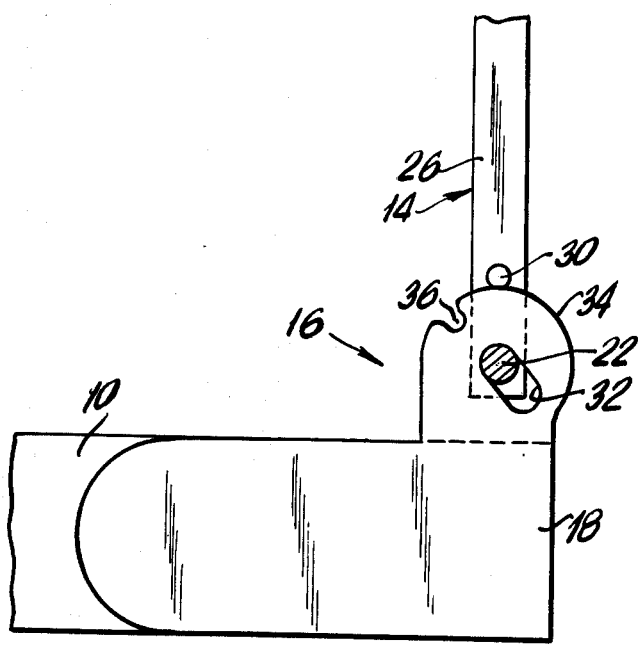
FIG. 5 is another elevation of the detail in FIGS. 2 and 4 showing the engagement means in an upright position.

If the operator wishes to raise the frame 26 to a vertical position or even to fold it back, he merely need pass the locking grooves 36 while rotating the frame to the position shown in FIG. 5, or even further in the clockwise direction beyond the vertical position.

Figure 6:
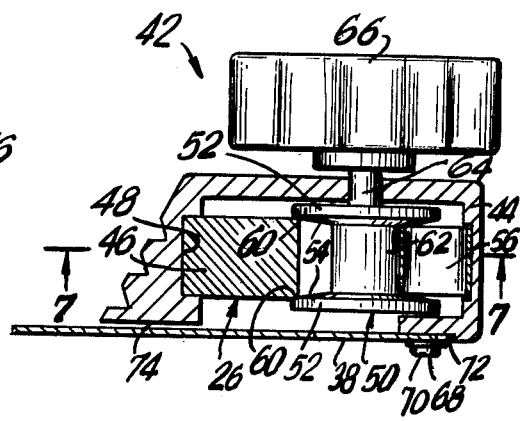
FIG. 6 is a sectional view of a blade mount of the masking assembly in FIG. 1.
Figure 7:
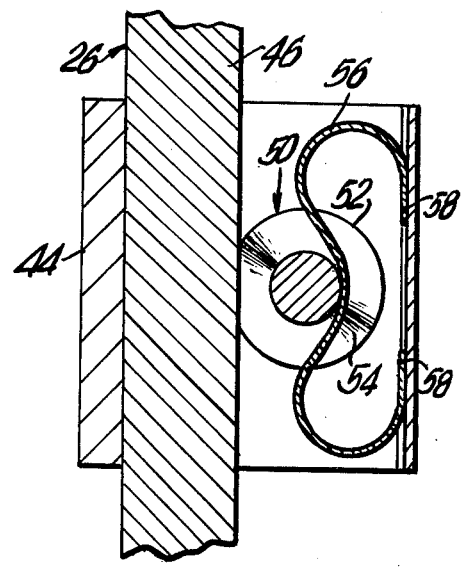
FIG. 7 is a section 7—7 of FIG. 6.

Suspended from the bottom of the frame 26 are four opaque blades 38. These blades form a border for printing paper mounted in the slots 40 of the base unit 10. The blades are made movable by respective friction drive units 42 which are more specifically shown in FIGS. 6 and 7. Here, a C-shaped aluminum extrusion 44 receives one bar 46 of the frame 26 in a recess 48. A spool 50 having flanges 52 with inwardly tapering interior walls 54 receives the other end of the member 46. A band shaped spring 56 secured to one wall of the extrusion 44 at points 58 biases the spool 50 in the leftward direction of FIG. 6 so as to press the tapered walls 54 against the edges 60 of the member 46 by pressing against the hub 62 of the spool 50. By forming the spring 56 into the shape shown, a single leaf member is capable of providing all the force necessary for operating the friction drive mechanism. A shaft 64 axially keyed to the spool 50 passes through an opening in the extrusion 44 and terminates at a circular handle 66 to which it is also keyed. By turning the handle 66 an operator turns the spool 62, which is pressed by the spring 56 against the stationary member 46, and thereby causes the frictional engagement of the edges 60 with the walls 54 to move the spool longitudinally (in and out of the page in FIG. 6 and up and down in FIG. 7) along the member 46. The spool 50, by virtue of passage of the shaft 64 through the extrusion 44, carries with it the entire extrusion as it moves longitudinally along the member or bar 46.

Fitted into a step 68 on the underside of each extrusion 44 is one of the blades 38 which is held in place by suitable screws and washers 70. The vertical member of the step 68 is parallel to the leftward wall of the recess 48. At the same time, the end 72 of the blade 38 is made perpendicular to the longitudinal edges of the blade. In this manner, fitting the end 72 in the blade 38 against the right hand end of the step 68 aligns the blade properly for movement relative to the member 46. Preferably the screws 70 pass through slots in the blade 38 so that the blade can be aligned on the basis of the step 68. According to another embodiment, the blades 38 are spaced from the step 68 to permit adjustment of the blades by the screws 70. The step 68 is lower than the forward bottom face 74 of the extrusion 44 so that the blade 38 clears the forward end of the extrusion. The spring 56 may be secured to the extrusion at the points 58 by welding or riveting or other suitable means.

To move the blades, an operator merely turns the circular handles 66 until the blades are their desired positions. The ends of the blades opposite the friction drives 42 each pass under the frame and are bent upwardly around the frame member at which they terminate.

Figure 8:
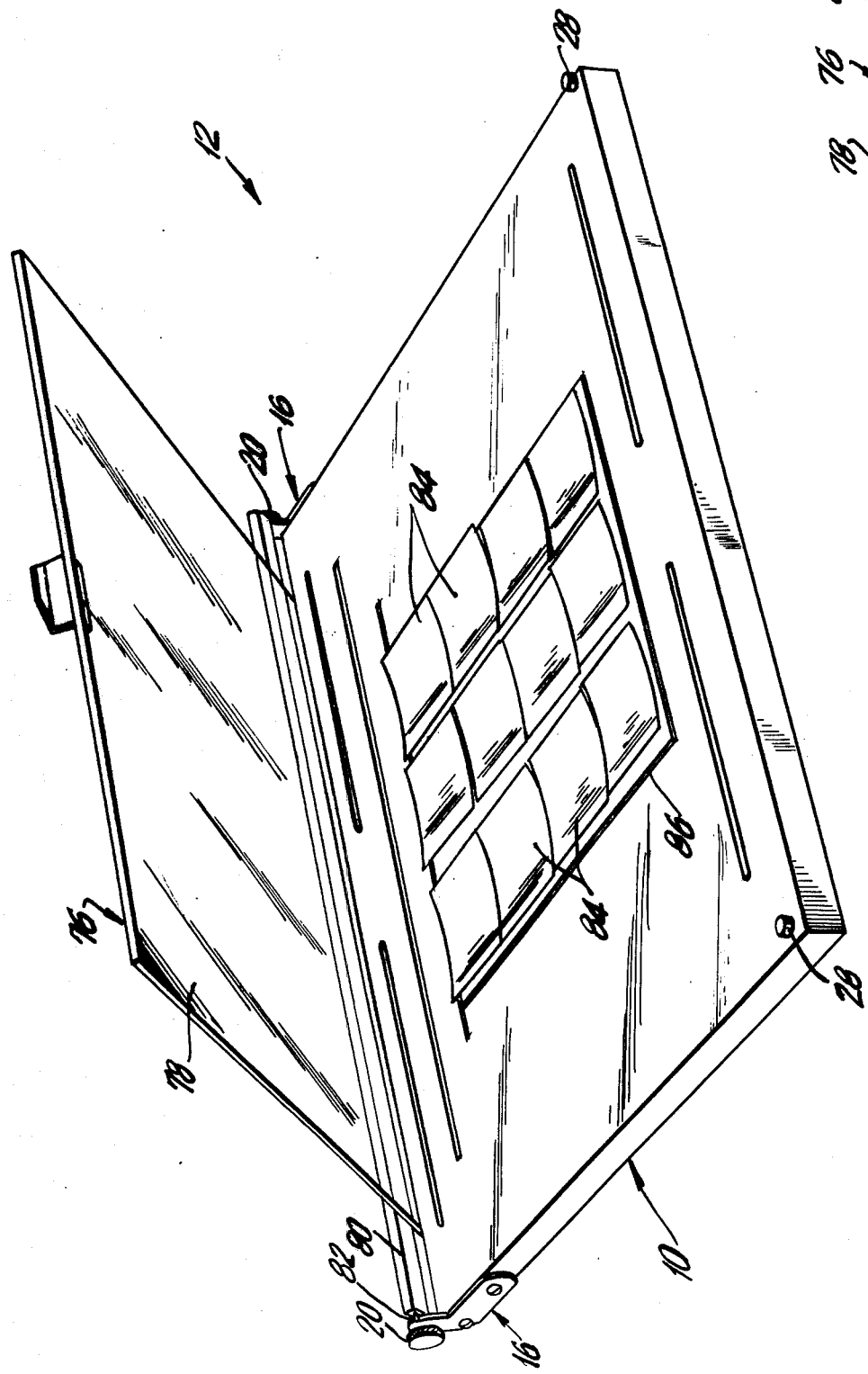
FIG. 8 is a perspective view of the system in FIG. 1 employing a second attachment.

The base unit 10 is adapted for use with other accessories by removing the thumbscrews 20 and withdrawing the assembly 14. This permits installation of a contact printing or enlarging kit 76 as shown in FIG. 8. Here, the kit includes a glass or plastic transparent plate 78 mounted on a spine 80 that receives the thumbscrews 20. The arrangement form hinges 16 which operate in the same manner as those in FIGS. 1 to 5. This permits the operator to set the plate 76 on a horizontal position as well as in the gravity locked position shown in FIG. 8 and in FIG. 4.

Figure 9:
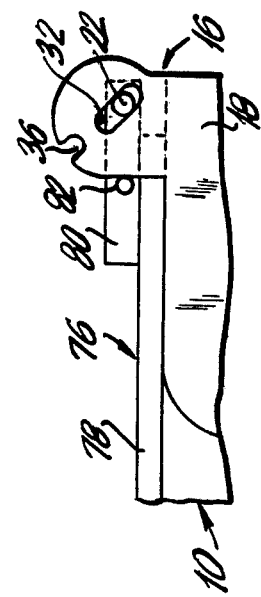
FIG. 9 is an elevation illustrating the hinging of the attachment in FIG. 8.

The hinging arrangement for the kit 76 differs from that of the assembly 14 in several aspects. The plate 78 is mounted under the spine 80 so as to lie flat against the base unit 10. For this, and reasons of economy, the plate 78 is made smaller than the frame 26 so that the spacers 28 do not prevent the plate 78 from resting against the top face of the unit 10. Furthermore, pins 82, corresponding to the pins 30, project from the end of the spine 80, but at a distance greater from the hinge section 22 than the distance from the hinge section 22 to the pin 30. More accurately, the distance being measured is that from the threaded opening that receives the threaded portion 24 of the thumbscrew 20 to the pin 82. This distance is made large enough so that the plate 78 rests directly on the base unit 10. The slot 32 is sufficiently long so that the pin 82 can fit into the locking groove 36 when the operator lifts the plate 76 to change paper or paper and negatives. Several negatives 84 and details of the hinge 16 with the plate 78 in the horizontal position are shown in FIG. 9. To attach the kit 76 the operator passes the thumbscrews 20 through the slots 32 and into the spine 80. In use the operator lifts the plate 78 until the pins 82 align with grooves 36 and then release the plate. He then places paper 86 and prints 84 on the base unit 10 lifts the plate so the pins 82 come out of the grooves and then lowers the plate onto the base.

Borders are commonly provided on printed enlargements of photographs. However, it is often desirable to take advantage of the entire printed area of enlarging paper by production of borderless prints. Just as the base unit 10 permits rapid and convenient setting of photographic paper for bordered enlargements, it can also be adapted for rapid and convenient use with borderless prints. Normally, it would appear that borderless prints could be achieved simply by laying the paper upon the base unit 10. However, conventional photographic paper is sometimes curled. Therefore, it is necessary to hold the paper flat, but without shading portions of the paper. A glass or transparent plastic plate 76 is suitable for this purpose, but only with contact prints. The intersurface reflections of the glass, and the losses inherent therein, create distortions which make plates such as 78 unsuitable for producing borderless prints.

Figure 10:
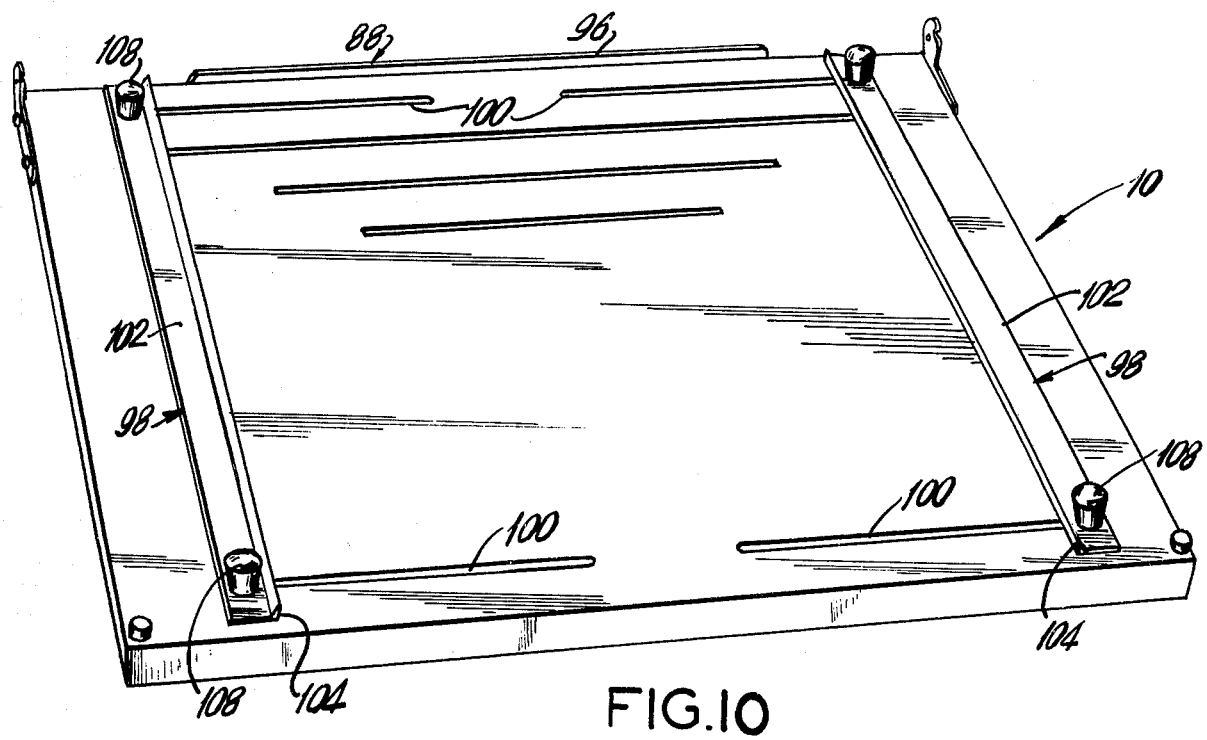
FIG. 10 is a perspective view of the system embodying the invention employing still another attachment.
Figure 11:
FIG. 11 illustrates a portion of the attachment in FIG. 10.
Figure 12:
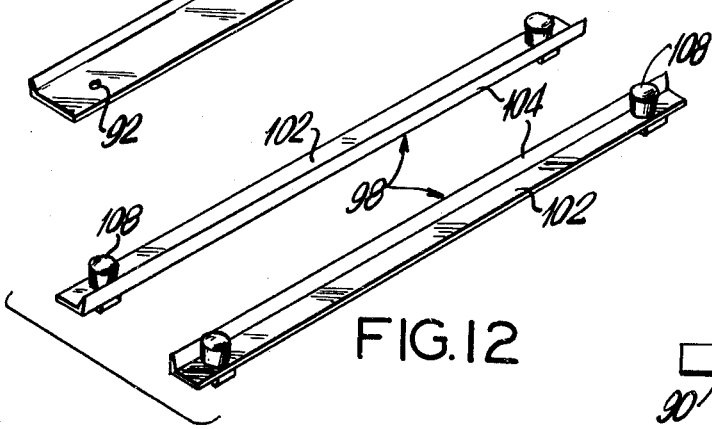
FIG. 12 illustrates other members utilized in FIG. 10.
Figure 14:
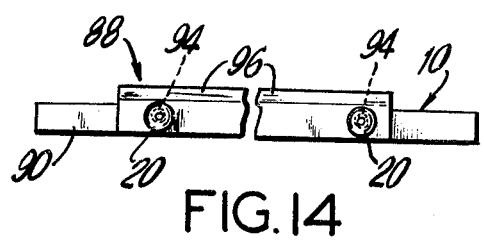
Figure 16:
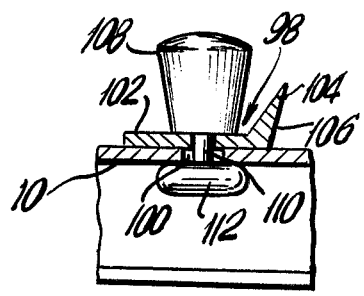
FIG. 16 is a sectional view illustrating the second step for mounting the members of FIG. 12 in the system of FIG. 10.

Borderless prints are achievable in the system according to the invention, by first removing all other attachments, such as the assembly 14 from the base unit 10. This involves unthreading the thumbscrews 20 and then lifting out the assembly 14. Once the unit 10 is clear, the thumbscrews 20 can be used to mount a rear metal retaining plate 88 as shown in FIG. 10 onto the back wall 90 of the base unit 10. The latter is composed of a flat sheet member which is folded over to form back, front and side walls and then folded under. The thumbscrews 20 are passed through openings 92 in the plate 88 and then threaded to threaded opening 94 in the wall 90. Two such threaded openings 94 exist in the rear wall 90 of the unit 10. The thumbscrews 20 secure the retaining plate in place. An upper portion 96 on the retaining plate leans inwardly 10° toward the unit 10 when the plate is properly mounted. Also included in the borderless mounting kit are two paper retaining bars 98, shown in FIGS. 11 and 12. These bars are mounted transverse to four longitudinal slots 100 as shown in FIG. 14. Mounting is accomplished as shown in sequence in FIG. 15 and FIG. 16.

Figure 15:
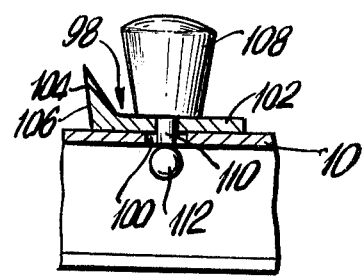
FIG. 15 illustrates the first step in mounting the members shown in FIG. 12 in the system of FIG. 10.
Figure 17:
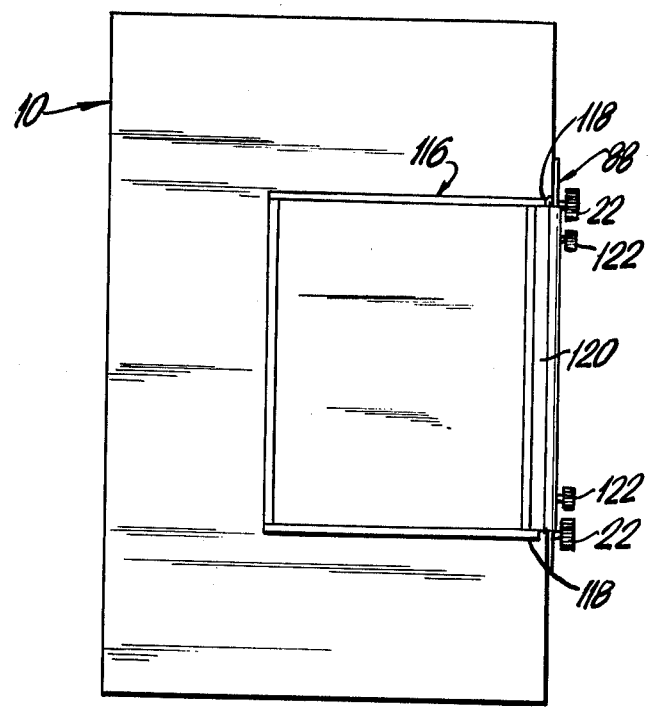
FIG. 17 is a plan view illustrating the system embodying the invention with still another attachment.
Figure 18:
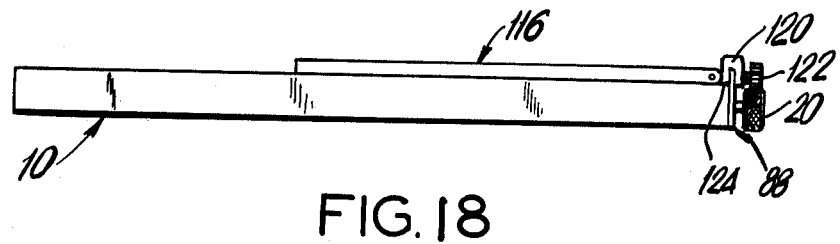
FIG. 18 is an elevation of FIG. 17.
Figure 19:
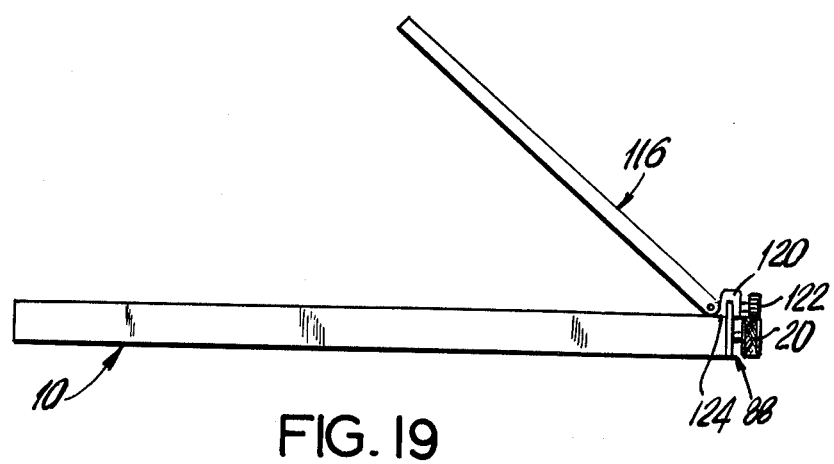
FIG. 19 is an elevation of FIG. 17 but with the border member raised for receiving printing paper.

The bars 98 include flat base members 102 and upstanding sidewalls 104 with inner surfaces 106 that lean in to each other 10° each from the vertical direction. Locking knobs 108 have keyed thereto shafts 110 which terminate in locking barrels 112. When the bar is first placed on the base unit 10, the knobs 108 are turned so that the locking barrels are parallel to the slots 100 and pass therethrough as shown in FIG. 15. The knobs 108 are then turned so that the barrels 112 are perpendicular to the slots 100 and squeeze the bars 110 and the base 10 between the bottom surface of the knob 108 and the barrel 112. This holds the bars 102 in position. The bars 98 are infinitely adjustable along the channels to set them for various paper sizes.

In use, an operator spaces the bars 98 so as just to receive the edges of the paper at the boundary between the base 10 and the bars 98. The operator then slides the paper between the bars and against the plate 88. The inward lean of the upstanding members 104 and upper portion 96 prevents the enlarging paper from curling as it normally would do. Nevertheless, the inward lean of the upstanding member and the upper portion is sufficiently small to allow the diverging light from the enlarging lens to reach all parts of the paper. Neither plate 88 nor the bars 98 cast shadows on the borderless prints.

Figure 13:
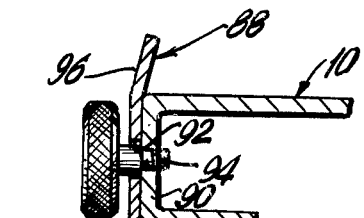
FIGS. 13 and 14 are a sectional and an elevation showing the arrangement for mounting the device in FIG. 11 in the system of FIG. 10.

The system may also be converted to a border type easel that accepts a single size format with fixed borders. This is essential for making large numbers of prints with a standard border, such as a one-quarter inch border. Such an attachment is shown in FIGS. 17 to 20. Here, a one-quarter inch frame 116 is hinged at projections 118 to an alluminum extrusion 120. Thumbscrews 122 secure the extrusion to the retaining plate 88. The latter is secured by the thumbscrews 20 to the base 10 as in FIGS. 13, 14, and 17. The frame 116 is swingable from the position shown in FIG. 18 to that and past that shown in FIG. 19 to receive the enlarging paper. After each exposure, the enlarging paper is removed and new enlarging paper put in its place.

The extrusion 120 is shaped with a slot to grasp the upper portion of the plate 88 and includes threaded holes for the thumbscrews 122 which secure it to the plate. The bottom surface 124 rests on the base 10 and forms a stop for the paper as it is inserted under the frame.

In use, this border-type easel may be utilized in conjunction with the bars 98. Thus, an operator first removes the assembly 14 and mounts the plate 88 and the bars 98 on the base 10. The bars are spaced far enough apart to permit easy placement of the border 116 between them. The extrusion 120 is then mounted on the plate 88 by means of the thumbscrews 122. The bars 98 then serve as guides for the paper which is placed under the frame 116 which forms the border. For convenience, the bars 98 can be adjusted after the extrusion 120 is mounted until they just touch the frame. This assures simple alignment of the paper as it is placed under the frame.

The brackets 18 may be regarded as part of a hinging arrangement, and the members 88 and 90 part of a holding arrangement.

While embodiments of the invention have been described in detail, it will be obvious to those skilled in the art that the invention may be embodied otherwise without departing from its spirit and scope.

What is claimed is:

1. A photographic easel system for engaging photographically sensitive material, comprising: a base, and engagement means removably secured to said base for engaging the photographically sensitive material; said base having a flat portion for supporting the material, a plurality of elongated edges, a hinging arrangement including a pair of hinge brackets secured to a pair of the edges, and a holding arrangement including a vertical portion extending vertically relative to the flat portion along one of the edges with said vertical portion having a pair of threaded openings and said flat portion having a plurality of slots parallel to the one of the edges; said engagement means being securable to one of said hinging arrangement and said holding arrangement.

2. A photographic easel system, as in claim 1, wherein said hinge brackets are secured to the pair of edges and extend transverse to the flat portion and terminate in respective upper portions, said upper portions forming coaxial arcs about a common axis, each bracket forming first and second spaced slots radial relative to the arcs, the first slot on each bracket extending radially inward from the upper portion at an acute angle relative to said flat portion of the base, the second slot embracing the axis and extending from the axis away from the first slot in alignment with the first slot.

3. A system as in claim 1, wherein said engagement means includes a plate having a fastened portion and a second portion and removable fastening means for fastening the fastened portion of the plate to said vertical portion of said base, said second portion being aligned by said first portion to form an elongated barrier for the material at the one edge, said engagement means including a pair of elongated bars removably mountable on said flat portion at the slots on a face of the flat portion which is to support the material, said elongated bars when mounted extending transverse to the direction of the plate for forming second and third barriers for the material.

4. A system as in claim 1, wherein said engagement means includes a plate having a fastened portion and a second portion and removable fastening means for fastening the fastened portion of the plate to said vertical portion of said base, said second portion being aligned by said first portion to form an elongated barrier for the material at the one edge, said engagement means including a frame of fixed dimensions, a spine along one edge of the frame, articulating means for hinging the frame to the spine, and securing means for securing the spine to said plate.

5. A system as in claim 2, wherein said engagement means includes an adjustable blade masking assembly having a frame, a plurality of movable masking blade arrangements movably mounted on the frame, a pair of first pins projecting from said frame for riding on the upper portions of the brackets and in the first radial slots in the brackets, a pair of second pins projecting through the second slots in the brackets and being secured to said frame.

6. A system as in claim 5, wherein the first pins have outer circumferences and said second pins have respective pin axes, the minimum spacing between the outer circumferences of the first pins and the axes of the second pins being substantially equal to the distance between the common axis of the arcs and the coaxial arcs.

7. An easel system as in claim 6, wherein said brackets and said pins are constructed to maintain the second pins so that the pin axes are coaxial with the common axis when said frame is in a substantially flat position parallel to the flat portion.

8. An easel system as in claim 7, wherein each of said brackets includes a vertical portion substantially tangential with the coaxial arcs and transverse to the flat portion and angular relative to the second slots so that movement of said first pins to the juncture of the coaxial arcs and the vertical portion maintains said second pins coaxial with the common axis.

9. A system as in claim 8, wherein said first pins slide into said first slots when the frame is moved to an angular position relative to the flat portion and released and said second pins slide along the second slot, said pins holding said frame in the angular position.

10. A system as in claim 5, wherein said frame includes four fixed peripheral members and said blade arrangements each include a masking blade extending across the frame and mounting means surrounding a frame member with the blade, said mounting means includes a C-shaped structure surrounding the frame member, and a spool having inwardly tapered flanges engaging the member within the structure and spring means biasing the inwardly tapered flanges against the member.

11. An assembly as in claim 10, wherein said spool contains a cylindrical portion between said flanges and said flanges are tapered so that the distance between the flanges is least at the cylindrical portion, said spring biasing the spool toward the frame member so that said frame member fits between the flanges.

12. A system as in claim 10, wherein said mounting means includes a shaft keyed to said spool and passing through said structure and a handle secured to said shaft outside said structure.

13. A system as in claim 11, wherein said mounting means includes a shaft keyed to said spool and passing through said structure and a handle keyed to said shaft outside said structure.

14. A system as in claim 3, wherein said second portion of said plate extends above the flat portion, said second portion being angled toward said flat portion so as to form an acute angle with said flat portion.

15. A system as in claim 3, wherein said elongated bars each includes a flat base for lying on said flat portion and an upstanding ridge forming one of said second and third barriers, said ridges facing each other when said elongated bars are removably secured to said flat portion.

16. A system as in claim 15, wherein said ridges have surfaces facing each other when said elongated bars are removably secured to said flat portion, said surfaces on said ridges leaning toward each other and forming acute angles with said flat portion away from said flat plates.

17. A system as in claim 16, wherein said ridges are wedge-shaped and form a peaked edge.

18. A system as in claim 17, wherein said engagement means includes a plurality of knobs having shafts projecting through said elongated bars, and a plurality of barrel-shaped fastening members capable of projecting longitudinally through said slots, said barrel-shaped fastening members being keyed to said shafts and securing said plates to said flat portion when passed through said slots and turned by said knobs.

19. A system as in claim 18, wherein said second portion of said plate extends above the flat portion, said second portion being angled toward said flat portion so as to form an acute angle with said flat portion.

20. A system as in claim 16, wherein said second portion of said plate extends above the flat portion, said second portion being angled toward said flat portion so as to form an acute angle with said flat portion.

21. A system as in claim 2, wherein said engagement means includes a spine, a transparent plate secured to said spine, a pair of first pins projecting longitudinally from said spine for riding on the upper portions of the brackets and in the first radial slots in the brackets, and a pair of second pins projecting through the second slots in the brackets and being secured to said spine.

22. A system as in claim 21, wherein the first pins have outer circumferences and said second pins have respective pin axes, the minimum spacing between the outer circumferences of the first pins and the axes of the second pins being substantially equal to the distance between the common axis of the arcs and the coaxial arcs.

23. A system as in claim 22, wherein said brackets and said pins are constructed to maintain the second pins so that the pin axes are coaxial with the common axis when said frame is in a substantially flat position parallel to the flat portion.

24. A system as in claim 21, wherein each of said brackets includes a straight portion substantially tangential with the coaxial arcs and transverse to the flat portion and angular relative to the second slots so that movement of said first pins to the juncture of the coaxial arcs and the vertical portion maintains said second pins coaxial with the common axis.

25. A system as in claim 21, wherein said first pins slide into said first slots when the frame is moved to an angular position relative to the flat portion and released and said second pins slide along the second slot, said pins holding said frame in the angular position.

26. A system as in claim 21, wherein said transparent plate has a surface facing the flat portion, said surface being spaced from the axis of said pins so that said surface lies on the flat portion when said flat surface is lowered toward said flat portion.

27. A system as in claim 14, wherein said engagement means further includes a frame of fixed dimensions, a spine along one edge of the frame, articulating means for hinging the frame to the spine, and securing means for securing the spine to said plate.

28. A system as in claim 15, wherein said engagement means further includes a frame of fixed dimensions, a spine along one edge of the frame, articulating means for hinging the frame to the spine, and securing means for securing the spine to said plate.

29. A system as in claim 16, wherein said engagement means further includes a frame of fixed dimensions, a spine along one edge of the frame, articulating means for hinging the frame to the spine, and securing means for securing the spine to said plate.

30. A system as in claim 18, wherein said engagement means further includes a frame of fixed dimensions, a spine along one edge of the frame, articulating means for hinging the frame to the spine, and securing means for securing the spine to said plate.

* * * * *